US012716550B2

(12) United States Patent
Caldwell et al.

(10) Patent No.: US 12,716,550 B2
(45) Date of Patent: Aug. 25, 2026

(54) HYDROGEN DEFUEL SYSTEM FOR HYDROGEN TANKS

(71) Applicant: Caterpillar Inc., Peoria, IL (US)

(72) Inventors: Curtis John Caldwell, Metamora, IL (US); Seth Michael Ost, Tucson, AZ (US)

(73) Assignee: Caterpillar Inc., Peoria, IL (US)

( * ) Notice: Subject to any disclaimer, the term of this patent is extended or adjusted under 35 U.S.C. 154(b) by 301 days.

(21) Appl. No.: 18/630,571

(22) Filed: Apr. 9, 2024

(65) Prior Publication Data

US 2025/0314353 A1 Oct. 9, 2025

(51) Int. Cl.

*F17C 7/00* (2006.01)
*F17C 13/12* (2006.01)

(52) U.S. Cl.

CPC .............. *F17C 7/00* (2013.01); *F17C 13/123* (2013.01); *F17C 2201/0114* (2013.01); *F17C 2203/0325* (2013.01); *F17C 2203/0391* (2013.01); *F17C 2203/0629* (2013.01); *F17C 2203/0639* (2013.01); *F17C 2203/0646* (2013.01);

(Continued)

(58) Field of Classification Search

CPC .. F17C 7/00; F17C 13/123; F17C 2201/0114; F17C 2203/0325; F17C 2203/0391; F17C 2203/0629; F17C 2203/0639; F17C 2203/0646; F17C 2203/0658; F17C 2205/0107; F17C 2205/013; F17C 2205/0326; F17C 2205/0332; F17C 2221/012; F17C 2250/032; F17C 2250/043; F17C 2250/0439; F17C 2250/0636; F17C 2260/044; F17C 2270/0168

See application file for complete search history.

(56) References Cited

U.S. PATENT DOCUMENTS 5,590,535 A * 1/1997 Rhoades .................. F17C 9/02 62/7
5,746,397 A * 5/1998 DeField ................. B64D 37/26 244/135 R (Continued)

FOREIGN PATENT DOCUMENTS

CN 100588938 C 2/2010
CN 110094633 A 8/2019

(Continued)

*Primary Examiner* — Paul R Durand
*Assistant Examiner* — Michael J. Melaragno

(57) ABSTRACT

A H2 defueling system for automating defueling of a hydrogen tank is disclosed. The H2 defueling system comprises: a hydrogen storage tank containing hydrogen; a plurality of electronic valves configured for regulating hydrogen discharge of hydrogen from the hydrogen tank; at least one pressure sensor and at least one temperature sensor; a hydraulic circuit interconnecting the hydrogen tank, the plurality of electronic valves, the at least one pressure sensor and the at least one temperature sensor; and a control unit configured to: receive input from the at least one pressure sensor and the at least one temperature sensor; automatically adjust the flow rate of gaseous hydrogen from the storage tanks based on the input from the sensors to maintain the gaseous hydrogen within pressure limits; modulate operations of the plurality of electronic valves to control hydrogen discharge to control the flow of hydrogen from the hydrogen tank.

20 Claims, 8 Drawing Sheets

Single Flow Control Valve For The Tank System

(52) U.S. Cl.

CPC ................. *F17C 2203/0658* (2013.01); *F17C 2205/0107* (2013.01); *F17C 2205/013* (2013.01); *F17C 2205/0326* (2013.01); *F17C 2205/0332* (2013.01); *F17C 2221/012* (2013.01); *F17C 2250/032* (2013.01); *F17C 2250/043* (2013.01); *F17C 2250/0439* (2013.01); *F17C 2250/0636* (2013.01); *F17C 2260/044* (2013.01); *F17C 2270/0168* (2013.01)

(56) References Cited

U.S. PATENT DOCUMENTS

| | | | | |
|---|---|---|---|---|
| 10,018,303 | B1 * | 7/2018 | Won | B60P 3/225 |
| 11,312,229 | B1 * | 4/2022 | Yordanov | B62D 21/02 |
| 2003/0066565 | A1 * | 4/2003 | Hoang | F02M 21/0242 137/884 |
| 2004/0229088 | A1 * | 11/2004 | Hayashi | H01M 8/04395 429/432 |
| 2007/0257043 | A1 * | 11/2007 | Kanoya | F17C 13/026 141/82 |
| 2009/0277515 | A1 * | 11/2009 | Pechtold | G05D 23/125 137/468 |
| 2010/0003576 | A1 * | 1/2010 | Tamura | H01M 8/04231 429/418 |
| 2010/0003577 | A1 * | 1/2010 | Eguchi | H01M 8/04201 429/515 |
| 2011/0272048 | A1 * | 11/2011 | Glaeser | G05D 16/204 251/129.01 |
| 2012/0192989 | A1 * | 8/2012 | Schulze | H01M 8/04753 141/192 |
| 2014/0290790 | A1 * | 10/2014 | Mathison | F17C 5/007 141/94 |
| 2015/0352974 | A1 * | 12/2015 | Kawase | H01M 8/04373 701/22 |
| 2015/0377416 | A1 * | 12/2015 | Miyoshi | F17C 13/002 141/95 |
| 2016/0114793 | A1 * | 4/2016 | Saito | B60L 3/0053 701/22 |
| 2016/0195219 | A1 * | 7/2016 | Cort | F17C 11/005 141/237 |
| 2016/0305611 | A1 * | 10/2016 | Handa | F17C 5/06 |
| 2017/0314734 | A1 * | 11/2017 | Jung | F17C 5/06 |
| 2018/0138528 | A1 * | 5/2018 | Komiya | H01M 8/04201 |
| 2019/0086032 | A1 * | 3/2019 | Handa | F17C 5/06 |
| 2019/0338887 | A1 * | 11/2019 | Ehgartner | F17C 13/04 |
| 2020/0139808 | A1 * | 5/2020 | Rike | B60K 15/013 |
| 2020/0223684 | A1 * | 7/2020 | Natori | B67D 7/04 |
| 2021/0010642 | A1 * | 1/2021 | Kubista | F17C 5/06 |
| 2022/0250465 | A1 * | 8/2022 | Perko | B60K 15/03 |
| 2022/0302476 | A1 * | 9/2022 | Inoue | H01M 8/04462 |
| 2023/0366513 | A1 * | 11/2023 | Minas | F17C 5/02 |
| 2024/0151356 | A1 * | 5/2024 | Gambone | B60L 50/71 |
| 2024/0302002 | A1 * | 9/2024 | Muehleder | F17C 13/04 |
| 2025/0065711 | A1 * | 2/2025 | Crist | B60K 15/03006 |
| 2025/0164075 | A1 * | 5/2025 | Borup | F17C 5/06 |
| 2025/0314353 | A1 * | 10/2025 | Caldwell | F17C 13/123 |
| 2025/0361987 | A1 * | 11/2025 | Gonzalez Leon | F16K 37/0091 |
| 2025/0389389 | A1 * | 12/2025 | Higgins | F17C 3/00 |
| 2026/0036260 | A1 * | 2/2026 | Wessner | F17C 7/00 |

FOREIGN PATENT DOCUMENTS

| | | | | |
|---|---|---|---|---|
| CN | 210831431 U | 6/2020 | | |
| CN | 109781579 B | 4/2021 | | |
| CN | 114994422 A | 9/2022 | | |
| CN | 116404209 A | 7/2023 | | |
| KR | 102518693 B1 | 4/2023 | | |
| WO | WO-2008146122 A1 | * | 12/2008 | H01M 8/04761 |
| WO | WO-2009019596 A2 | * | 2/2009 | H01M 8/04089 |
| WO | WO-2021228508 A1 | * | 11/2021 | F17C 13/04 |
| WO | WO-2021239566 A1 | * | 12/2021 | F17C 5/00 |
| WO | WO-2025212082 A1 | * | 10/2025 | F17C 13/084 |
| WO | WO-2025242772 A1 | * | 11/2025 | F17C 13/10 |

* cited by examiner

Single Flow Control Valve For The Tank System

Multi Flow Control Valve For The Tank System

HYDROGEN DEFUEL SYSTEM FOR HYDROGEN TANKS

TECHNICAL FIELD

The present disclosure generally relates to hydrogen tank fuel systems, and more particularly relates to hydrogen tank defueling methods and systems for fuel conservation.

BACKGROUND

Hydrogen ("H2") power units such as fuel cells, hydrogen fueled internal combustion engines, and their associated fuel storage systems play a significant role in the pursuit of clean and efficient energy solutions. Hydrogen storage tanks are commonly used in various applications, including mobile machines and vehicles powered by hydrogen fuel cells. These tanks are designed to store hydrogen at high pressures and, in some cases, at cryogenic temperatures. The refueling and defueling of these tanks must be managed carefully to maintain the integrity of the tank and the safety of the surrounding environment due to the volatile nature of hydrogen.

The conventional defueling process is often manual, which can be slow and labor-intensive. It requires constant monitoring to ensure that the temperature and pressure within the hydrogen storage tank remain within safe operating limits. This process is prone to human error, which can lead to safety hazards such as the risk of explosion or damage to the storage tank if the hydrogen becomes too hot or cold during the defueling process. Additionally, the manual process is not efficient, leading to increased downtime for vehicles and machinery, which can be particularly costly in commercial or industrial settings.

Furthermore, the defueling process can be complicated when dealing with multiple storage tanks, as is often the case with large vehicles like hydrogen-powered locomotives or trucks. Each tank may require individual monitoring and control, which further compounds the complexity and time required for defueling.

In light of the above issues, there is a need for an automated defueling system that can safely and efficiently manage the defueling process. Such a system would minimize the need for manual intervention, reduce the risk of human error, and provide a more efficient and cost-effective solution for the maintenance of hydrogen-powered machines and vehicles.

Others have attempted to develop a system capable of managing the complexities associated with the defueling of hydrogen storage tanks. For example, Korean Patent KR102518693, addresses the use of thermostats or temperature sensors to control the opening or closing of valves in high-pressure vessels to prevent sudden temperature drops that could compromise the vessel's integrity and surrounding systems. KR102518693 outlines a gas exhausting apparatus that uses a thermostat or temperature sensor to control the opening or closing of an exhaust valve, mitigating the potential for sudden temperature drops that could compromise the integrity of high-pressure vessels and surrounding systems. While this approach provides a mechanism for preventing damage due to temperature fluctuations, it does not offer a solution for managing the defueling process, particularly in scenarios requiring precise control over the exhaust of high-pressure gases to ensure safety and conservation of resources. The need remains for an advanced defueling system that not only addresses the challenges of temperature management but also automates the exhaust process with precise controls.

It can therefore be seen that a need exists for the automated defueling of hydrogen storage tanks that are efficient, safe, and adaptable to different types of hydrogen storage tanks and environmental conditions.

SUMMARY

In accordance with one aspect of the disclosure, a H2 defueling system for automating defueling of a hydrogen tank is disclosed. The H2 defueling system comprises: a hydrogen storage tank containing hydrogen; a plurality of electronic valves configured for regulating hydrogen discharge of hydrogen from the hydrogen tank; at least one pressure sensor and at least one temperature sensor; a hydraulic circuit interconnecting the hydrogen tank, the plurality of electronic valves, the at least one pressure sensor and the at least one temperature sensor; and a control unit configured to: receive input from the at least one pressure sensor and the at least one temperature sensor; automatically adjust the flow rate of gaseous hydrogen from the hydrogen storage tank based on the input from the at least one pressure sensor and the at least one temperature sensor to modulate operations of the plurality of electronic valves to control the flow of hydrogen defueling from the hydrogen storage tank.

In accordance with another aspect of the disclosure, a method for automating defueling of a hydrogen tank in a hydrogen fuel system is disclosed. The method comprises: receiving, by a control unit, input from at least one pressure sensor and at least one temperature sensor associated with a hydrogen storage tank containing hydrogen; adjusting, by the control unit modulating a plurality of electronic valves, the flow rate of gaseous hydrogen from the hydrogen storage tank based on the input from the at least one pressure sensor and at least one temperature sensor to maintain a regulated defueling of hydrogen from the hydrogen fuel system.

In accordance with another aspect of the disclosure, a hydrogen fuel system is disclosed. The hydrogen fuel system comprises: a hydrogen tank for storing gaseous hydrogen; a hydrogen power unit configured to convert gaseous hydrogen into energy; a hydrogen fuel circuit including a plurality of hydraulic lines for conveying gaseous hydrogen from the hydrogen tank to the hydrogen power unit; a hydrogen defueling system integrated with the hydrogen fuel system, the defueling system comprising: a plurality of electronic valves positioned within the hydraulic circuit to regulate the discharge of gaseous hydrogen from the hydrogen tank and control the supply of gaseous hydrogen to the hydrogen power unit; at least one pressure sensor and at least one temperature sensor positioned on the hydrogen tank and the hydraulic circuit to monitor pressure and temperature of the hydrogen fuel system; a control unit in communication with the at least one pressure sensor, the at least one temperature sensor, and the plurality of electronic valves, the control unit configured to: receive real-time data signals from the at least one pressure sensor, the at least one temperature sensor, and the plurality of electronic valves; automatically adjust the flow rate of gaseous hydrogen from the hydrogen storage tank by modulating the plurality of electronic valves to control the gaseous hydrogen flow in the plurality of hydraulic lines and discharge the gaseous hydrogen from the hydrogen storage tank for defueling the hydrogen fuel system.

These and other aspects and features of the present disclosure will be better understood upon reading the following detailed description when read in conjunction with the accompanying drawings.

Figure 1:
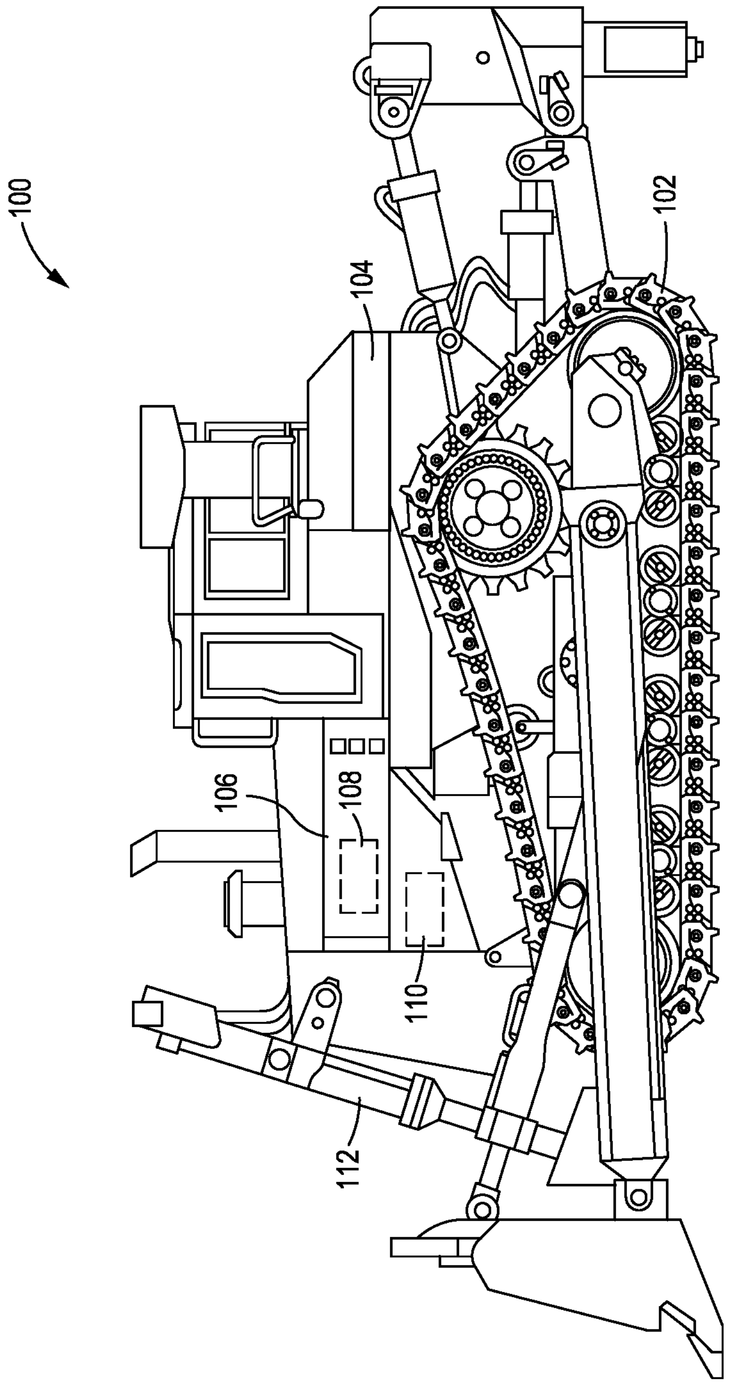
FIG. 1 is a perspective view of a work machine, according to an embodiment of the present disclosure.

The figures depict one embodiment of the presented disclosure for purposes of illustration only. One skilled in the art will readily recognize from the following discussion that alternative embodiments of the structures and methods illustrated herein may be employed without departing from the principles described herein.

DETAILED DESCRIPTION

Referring now to the drawings, and with specific reference to the depicted example, a work machine 100 is shown, illustrated as an exemplary earthmoving machine. Earthmoving machine are heavy mobile equipment designed to move earth material from the ground or landscape at a dig site in the construction and agricultural industries. While the following detailed description describes an exemplary aspect in connection with the earthmoving machine, it should be appreciated that the description applies equally to the use of the present disclosure in other mobile and stationary work machines, including, but not limited to, earthmoving machines, excavators, generators, backhoes, front-end loaders, shovels, draglines, skid steers, wheel loaders, and tractors, as well.

Referring now to FIG. 1, the work machine 100 comprises ground engaging elements 102, illustrated as continuous tracks, that support a frame 104. It should be contemplated that the ground engaging elements 102 may be any other type of ground engaging elements 102 such as, for example, wheels, etc. The work machine 100 further includes a H2 power unit 106, a battery 108, and a H2 tank 110 mounted on the frame 104. The machine may include a work implement 112 extending from the frame 104 for conducting work, such as, for example, excavating landscapes or otherwise moving earth, soil, or other material at a dig site. The frame 104 may have an upper swiveling body common with earthmoving machines, excavators, and other work machines in the agricultural and construction industries. The H2 power unit 106 may be provided as a plurality of fuel cells, a fuel cell stack, or as a H2 combustion engine, as generally known in the arts. The H2 tank 110 may be provided in or on the frame 104 for storing gaseous hydrogen 200 and/or liquid hydrogen fuel for the work machine 100.

Figure 2:
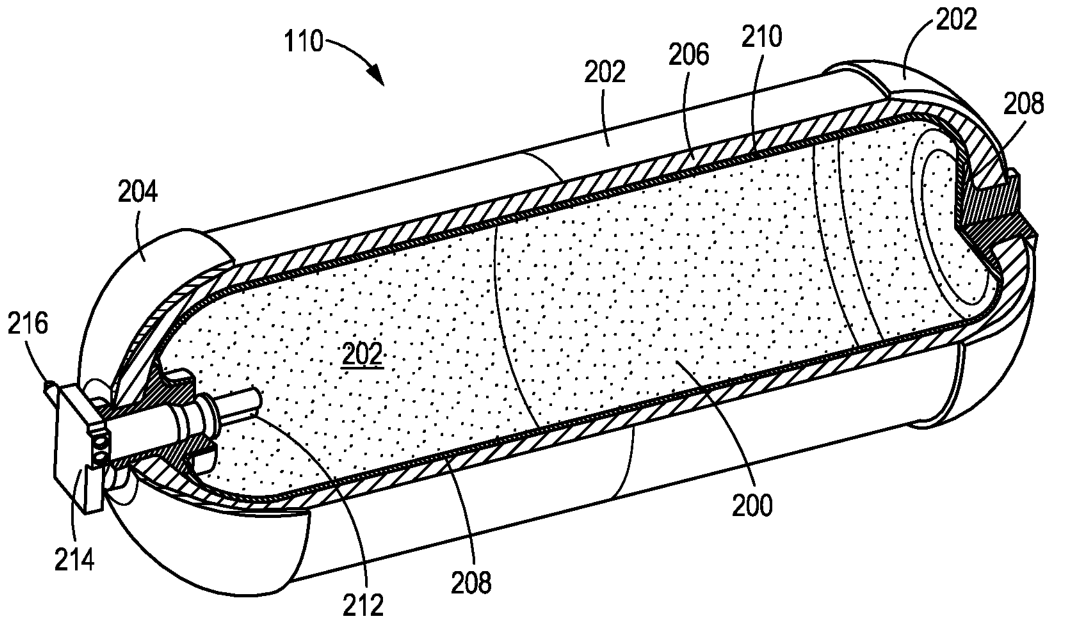
FIG. 2 is a perspective cut-away view of a H2 tank for use in a hydrogen fuel system, according to an embodiment of the present disclosure.

Now referring to FIG. 2, a cut-away perspective view of the H2 tank 110 is illustrated, according to another embodiment of the disclosure. The H2 tank 110 includes gaseous hydrogen 200. The H2 tank 110 may include an inner shell 202 and an outer shell 204 made of carbon fiber composite to contain the gaseous hydrogen 200 with high pressures in the H2 tank 110. It may be recognized that the inner shell 202 and the outer shell 204 may be made of other metals and or polymers, as generally known in the arts. Between the inner shell 202 and the outer shell 204 is an annular space 206. The annular space 206 may contain an insulation 208 to reduce heat transfer. The insulation 208 in the annular space 206 may include multiple layers of high-performance insulation materials, including aerogel blankets and vacuum-sealed panels, or a vacuum insulation configured in a double-walled H2 storage tank, to minimize heat transfer and improve conservation, as generally known in the arts. The H2 tank 110 may include a polymer lining 210 within the inner shell 202 to contain the gaseous hydrogen 200 within the inner shell 202.

The H2 tank 110 also includes a temperature sensor 212, an electronic solenoid valve 214, and a temperature pressure relief device 216 ("TPRD 210"), a type of valve for releasing or venting an amount of gaseous hydrogen 200 when the pressure or temperature in the H2 tank 110 exceeds a temperature and pressure safety threshold.

Figure 3:
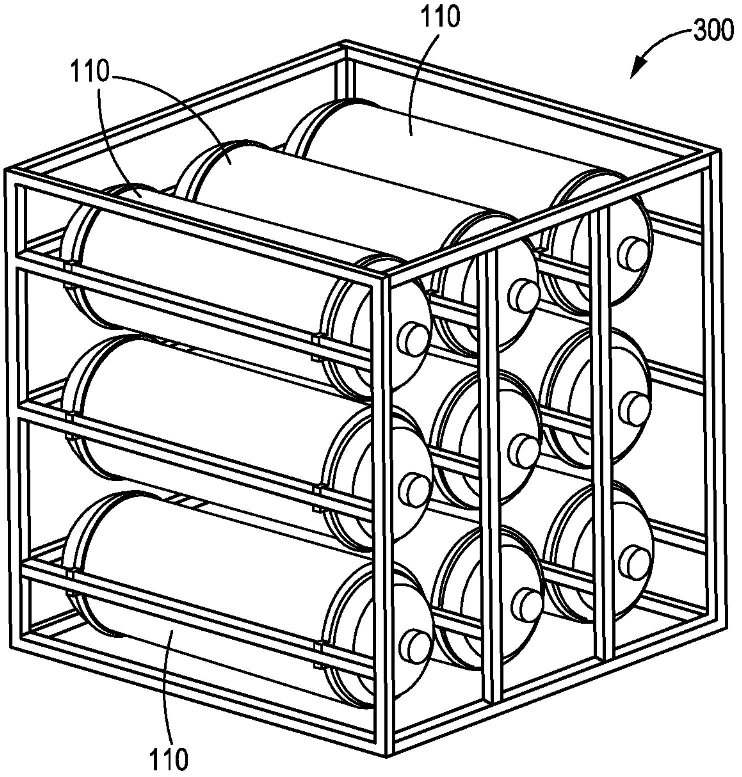
FIG. 3 is a perspective view of a plurality of the H2 tank of FIG. 2, according to another embodiment of the present disclosure.

Now referring to FIG. 3, a plurality of H2 tanks 300 are illustrated, according to an embodiment of the disclosure. The plurality of the H2 tanks 300 include one or many of the H2 tank 110 and may be provided in the work machine 100 to increase the amount of gaseous hydrogen 200 available as fuel. The plurality of H2 tanks 300 may also be provided in a facility, or other buildings.

Figure 4:
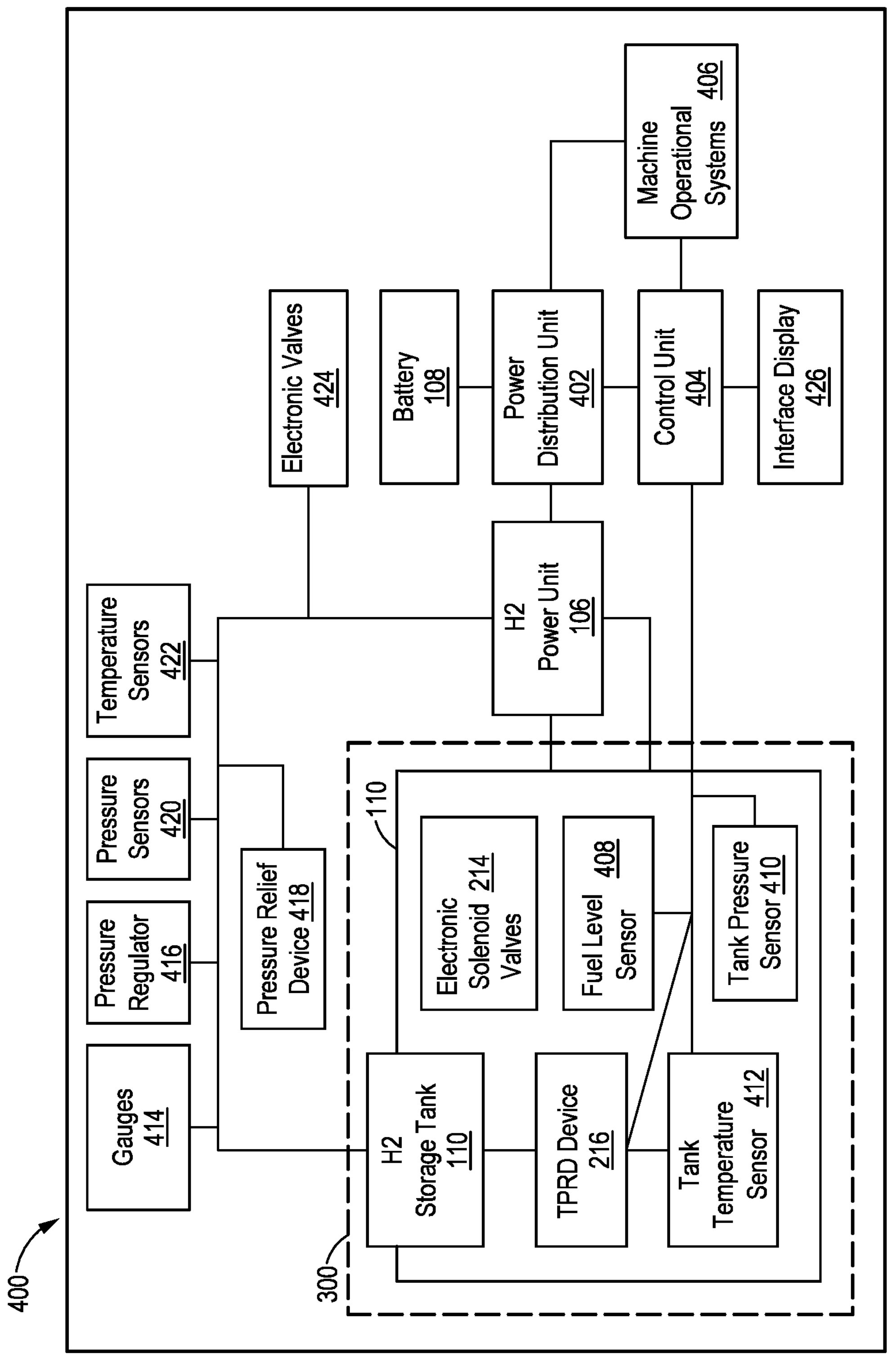
FIG. 4 is a schematic block diagram of a H2 defuel system in a H2 fuel system, according to an embodiment of the present disclosure.

Now referring to FIG. 4, a block diagram of a H2 defuel system 400 is illustrated, according to one embodiment of the disclosure. The H2 defuel system 400 may comprise the H2 power unit 106, the H2 tank 110 or the plurality of H2 tanks 300, a power distribution unit 402 ("PDU 402"), and a control unit 404. The H2 power unit 106 may be hydraulically connected to the H2 tank 110 for consuming the gaseous hydrogen 200. The H2 power unit 106 converts the gaseous hydrogen 200 into electrical energy and supplies the electrical energy to the PDU 402.

The control unit 404 may be embodied in a general machine microprocessor capable of controlling numerous machine functions. The control unit 404 may include a memory, a secondary storage device, a processor, and any other components for running an application as well as storing the collection of data and the signals received. The control unit 404 may be further connected to the machine operational systems 406, as generally known in the arts. The control unit 404 is equipped with advanced algorithms that analyze input from the system's sensors to make real-time decisions for regulating hydrogen flow. It adjusts the opening degrees of electronic valves 424 based on the current hydrogen pressure, tank temperature, and operational demand from the H2 power unit 106. The software in the control unit 404 is designed for adaptability, allowing it to respond to a wide range of scenarios from routine defueling to emergency venting, ensuring optimal performance and safety under all conditions.

Each of the plurality of H2 tanks 300 may include the electronic solenoid valve 214 which is a binary on/off valve and remains on the tanks. The H2 tank 110 may include a fuel level sensor 408 for measuring the amount of gaseous hydrogen 200 fuel remaining in the H2 tank 110, a tank pressure sensor 410 for measuring pressure in the H2 tank 110, and a tank temperature sensor 412 for monitoring temperatures in the H2 tank 110. The fuel level sensor 408 may communicate a fuel level signal to the control unit 404 indicating a fuel level remaining of the gaseous hydrogen 200, over time. The control unit 404 may also have digital interfaces that allow for integration with various monitoring and control systems in the work machine 100.

Additionally, the control unit 404 may receive signals from one or more gauges 414, one or more pressure regulators 416, one or more pressure relief devices 418, a plurality of pressure sensors 420, a plurality of temperature sensors 422, and a plurality of electronic valves 424. With these signals, the control unit 404 may further monitor and control the flow of gaseous hydrogen 200 to the H2 power unit 106. The control unit 404 may be further connected to an interface display 262 to allow access to the controls of the control unit 404. The control unit 404 may also display various parameters and diagnostics of the H2 defuel system 400 on the interface display 426, such as an estimated time remaining for defueling based on the signals received from the various sensors, gauges 414, valves, and devices disclosed herein. The interface display 426 provides a user-friendly platform for operators to interact with the control unit 404, offering insights into system status, operational parameters, and alerts, thereby enhancing the operability and monitoring of the defueling system.

Figure 5:
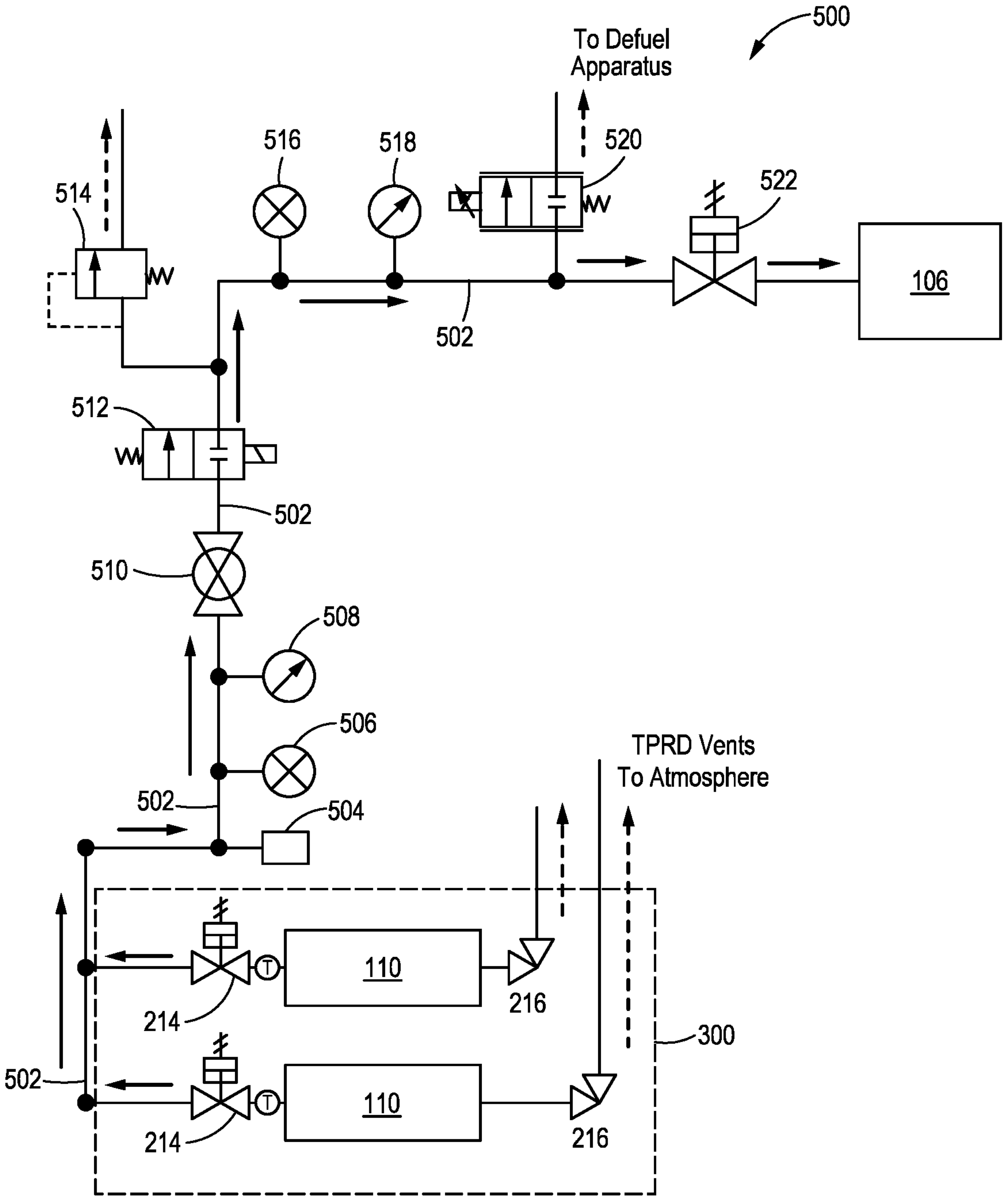
FIG. 5 is a schematic diagram of a H2 defuel circuit for the H2 defuel system of FIG. 4, according to an embodiment of the present disclosure.

Now referring to FIG. 5, a H2 circuit 500 of the H2 defuel system 400 is illustrated, according to an embodiment of the disclosure. The H2 circuit 500 comprises the plurality of H2 tanks 300 connected to a H2 power unit 106 via hydraulic lines 502. Between the hydraulic connection of the plurality of H2 tanks 300 to the H2 power unit 106, the H2 circuit 500 may further include a fueling connector 504, a high pressure gauge 506, a high pressure sensor 508, a manual shut-off valve 510, a pressure regulator 512, a pressure relief valve 514, a low pressure gauge 516, a low pressure sensor 518, a flow control valve 520 and a shut-off valve 522 each connected to the plurality of hydraulic lines 502. The hydraulic circuit 502 serves to guide the flow of hydrogen from the storage tank to the power unit and ultimately to the defueling outlet. Each component within the hydraulic circuit 502, from the high-pressure gauge 506 to the manual shut-off valves 510, is strategically positioned to optimize the flow and maintain the integrity of the hydrogen at various pressure levels.

The fueling connector 504 serves as the interface for the transfer of hydrogen fuel from an external source into the plurality of H2 tanks 300. It is designed to ensure a secure and leak-proof connection during the refueling process. The construction of the fueling connector 504 typically involves materials compatible with high-pressure hydrogen to prevent degradation or failure.

A high pressure gauge 506 is installed within the H2 circuit 500 to provide a visual indication of the gaseous hydrogen 200 pressure within the hydraulic lines 502. This gauge is critical for monitoring the pressure of the H2 circuit 500 to ensure it remains within the specified operational limits, thus safeguarding the circuit components from overpressure conditions.

The high pressure sensor 508, similar in function to the high pressure gauge 506, offers electronic monitoring of the gaseous hydrogen 200 pressure. Its output is integral to the system's safety and operational control, as it provides real-time data to the control unit 404. This enables automated adjustments and safety measures based on the detected pressure levels.

A manual shut-off valve 510 is incorporated to manually isolate the H2 circuit 500 for maintenance or emergency purposes. This valve allows for the physical disconnection of the hydrogen flow, for ensuring safety during servicing of the work machine 100.

The pressure regulator 512 is tasked with reducing and stabilizing the gaseous hydrogen 200 pressure from high levels in the hydraulic lines 502 to levels suitable for consumption by the H2 power unit 106. The pressure regulator 512 maintains optimal operating conditions and prevents damage to the H2 power unit 106 due to excessive pressure in the H2 circuit 500.

The pressure relief valve 514 is a safety device designed to vent gaseous hydrogen 200 to the atmosphere in the event that the pressure within the H2 circuit 500 exceeds a predefined threshold. The pressure relief valve 514 prevents potential overpressure incidents that could compromise the integrity of the H2 circuit 600.

The low pressure gauge 516 provides a visual representation of the gaseous hydrogen 200 pressure after it has been regulated by the pressure regulator 512. The low pressure gauge 516 is important for monitoring the low-pressure side of the H2 circuit 500 to ensure that the H2 power unit 106 receives hydrogen at the correct pressure.

The low pressure sensor 518 provides electronic monitoring of the low-pressure side of the H2 circuit 500. The data from this sensor is communicated to and is used by the control unit 404 to ensure the H2 power unit 106 operates within safe and efficient pressure ranges.

The flow control valve 520 regulates the flow rate of gaseous hydrogen 200 to the H2 power unit 106, ensuring that the fuel supply matches the demand of the power unit. The flow control valve 520 optimizes the efficiency and performance of the H2 power unit 106. The flow control valve 520 is designed to regulate the hydrogen flow rate with high precision. The flow control valve 520 can be adjusted to any position between fully open and fully closed, allowing for fine-tuned controls over the amount of hydrogen passing through the H2 circuit 500 to exit for defueling and/or to the H2 power unit 106. The ability of the flow control valve 520 to throttle at any percentage of its opening provides a means to optimize the defueling process of the gaseous hydrogen 200 to exit the plurality of H2 tanks 300.

The flow control valve 520 is generally comprised of a valve body, an actuator, and a control mechanism. The valve body houses the components that interact directly with the hydrogen flow, including a movable element such as a diaphragm, piston, or ball, which adjusts the flow area within the valve. The actuator, which can be pneumatic, hydraulic, or electric, is responsible for moving the flow control element based on signals received from the control unit 404.

The control of the flow control valve 520 is engineered to respond to electronic signals from the control unit 404, translating these signals into mechanical movement of the control elements of the flow control valve 520 to ensure that the position is adjusted accurately in response to the commands of the control unit 404, allowing for real-time adaptation to the operational requirements of the H2 circuit 500. The control unit 404 is programmed to automatically adjust the position of the flow control valve 520, based on real-time data including the load demand of the H2 power unit 106, the hydrogen levels in the plurality of H2 tanks 300, and the operational status of the work machine 100.

This functionality permits the control unit 404 to precisely control the hydrogen flow to the h2 power unit 106 by adjusting the electronic valves 424 to the necessary position, ensuring the hydrogen supply is regulated in accordance with the immediate needs of the work machine 100.

Lastly, the shut-off valve 522 is a manual valve or an automated valve controlled by the control unit 404, designed to stop the flow of gaseous hydrogen 200 to the H2 power unit 106 under specific conditions, such as system shutdown or emergency situations.

The control unit 404 employs data from sensors such as the high pressure sensor 508 and the low pressure sensor 518 to automate the operation of the H2 defuel system 400. This includes controlling the flow control valve 520 and the shut-off valve 522 based on real-time conditions. By automating the defueling process through programmed algorithms, the control unit 404 ensures that the work machine 100 is adequately prepared for maintenance or storage without manual intervention. This automation reduces the potential for human error and enhances safety by minimizing the need for direct manual interaction with the system components during defueling, leading to a more streamlined and safer maintenance process for the work machine 100.

In the H2 circuit 500, the depressurization process commences with the monitoring of the H2 tank 110, utilizing the tank pressure sensor 410 and the tank temperature sensor 412 to gauge the initial pressure and temperature of the gaseous hydrogen 200. The depressurization phase involves precise manipulation of hydrogen flow within the H2 circuit 500, particularly through the flow control valve 520. The flow control valve 520 is located proximate to the shut-off valve 522 and near the H2 power unit 106, facilitating efficient control over the hydrogen discharge from the plurality of H2 tanks 300 and the H2 circuit 500, as a whole. The positioning of the flow control valve 520 in close proximity to the shut-off valve 522 allows for a coordinated control over the flow of the gaseous hydrogen 200, enhancing the specificity of the depressurization process.

The control unit 404 processes inputs from the tank pressure sensor 410 and the tank temperature sensor 412, leveraging data points to inform the adjustments made to the flow control valve 520 and the shut-off valve 522. This dynamic adjustment ensures that the depressurization is conducted at an optimal rate, adhering to the predetermined pressure and temperature targets.

Figure 6:
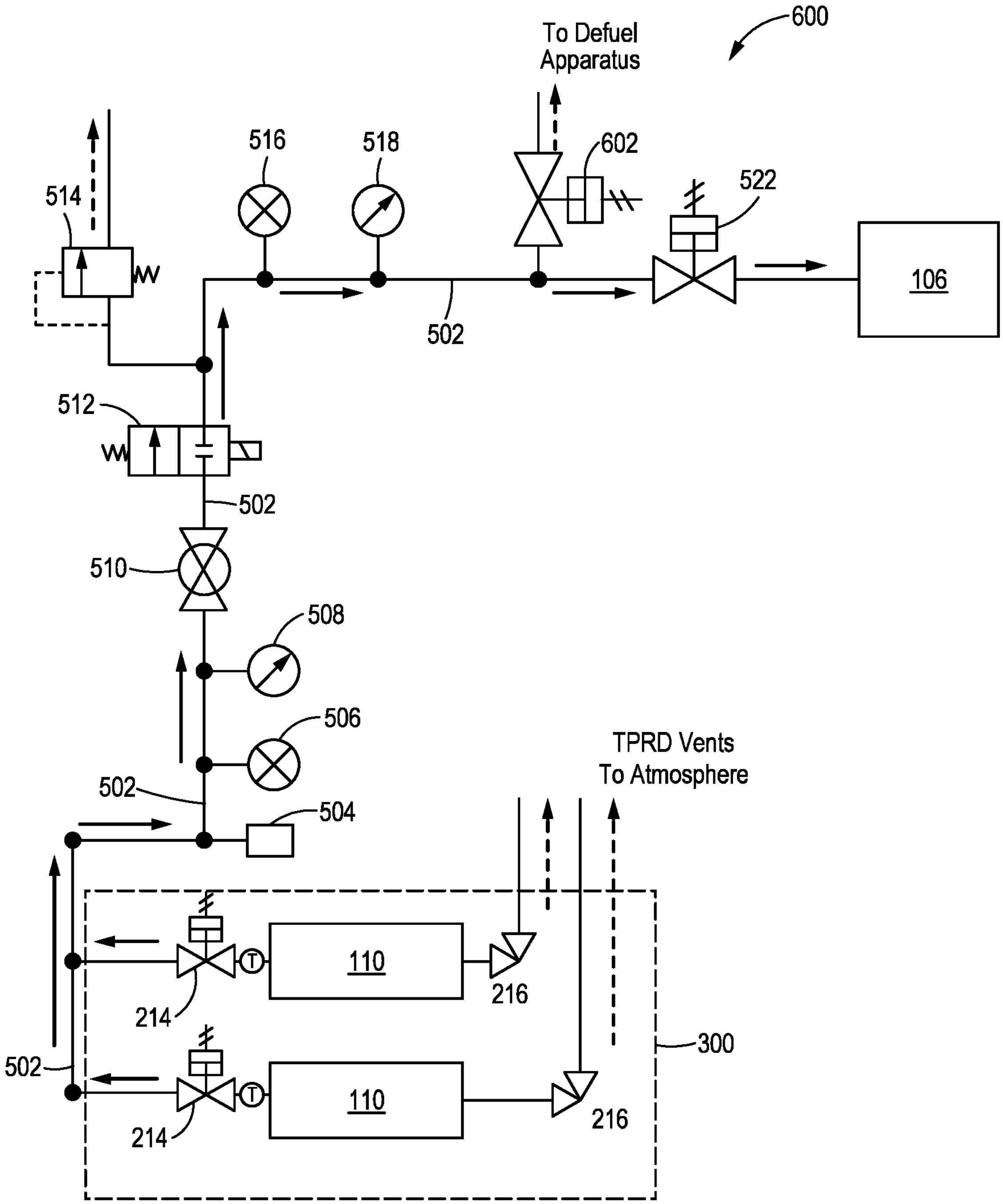
FIG. 6 is a schematic diagram of a second H2 defuel circuit for the H2 defuel system of FIG. 4, according to another embodiment of the present disclosure.

FIG. 6 illustrates a H2 circuit 600 of the H2 defuel system 400, according to another embodiment of the disclosure. In H2 circuit 600, the flow control valve 520 has been substituted with a purge valve 602, positioned within the circuit Unlike the flow control valve 520, which modulates the flow rate of hydrogen, the purge valve 602 is designed to facilitate the controlled release of hydrogen from the circuit, thereby purging the system of gaseous hydrogen 200 when necessary to prepare for maintenance or in response to specific operational conditions.

In this embodiment, the H2 circuit 700 employs the tank temperature sensor 412 and the electronic solenoid valve 214 equipped on each H2 tank 110 to regulate the hydrogen flow. The tank temperature sensor 412 provides real-time data on the gaseous hydrogen 200 temperature within the H2 tank 110. The electronic solenoid valve 214, in turn, offers control over the opening and closing of the gas passage from the H2 tank 110, enabling or restricting the flow based on the operational requirements of the circuit.

The H2 circuit 700, via the control unit 404, coordinates operation of the purge valve 602 and the electronic solenoid valve 214 to manage the gaseous hydrogen 200 within the system. This allows for a direct control mechanism over the release of gaseous hydrogen 200, wherein the purge valve 602 can be activated to swiftly reduce the hydrogen pressure in preparation for maintenance activities or to mitigate potential risks, ensuring the circuit maintains operational integrity and safety. The positioning of the purge valve 602, akin to the former placement of the flow control valve 520, controls the gas flow dynamics within the H2 circuit 700 prior to reaching the H2 power unit 106. The H2 defuel system 400 integrates several safety features designed to mitigate risks associated with hydrogen storage and handling. The TPRD 216 acts as a fail-safe, automatically venting hydrogen to prevent overpressure conditions. Leak detectors strategically positioned throughout the system provide early detection of unintended hydrogen release, triggering immediate shutdown procedures via the electronic solenoid valve 214 and the shut-off valve 522.

Figure 7:
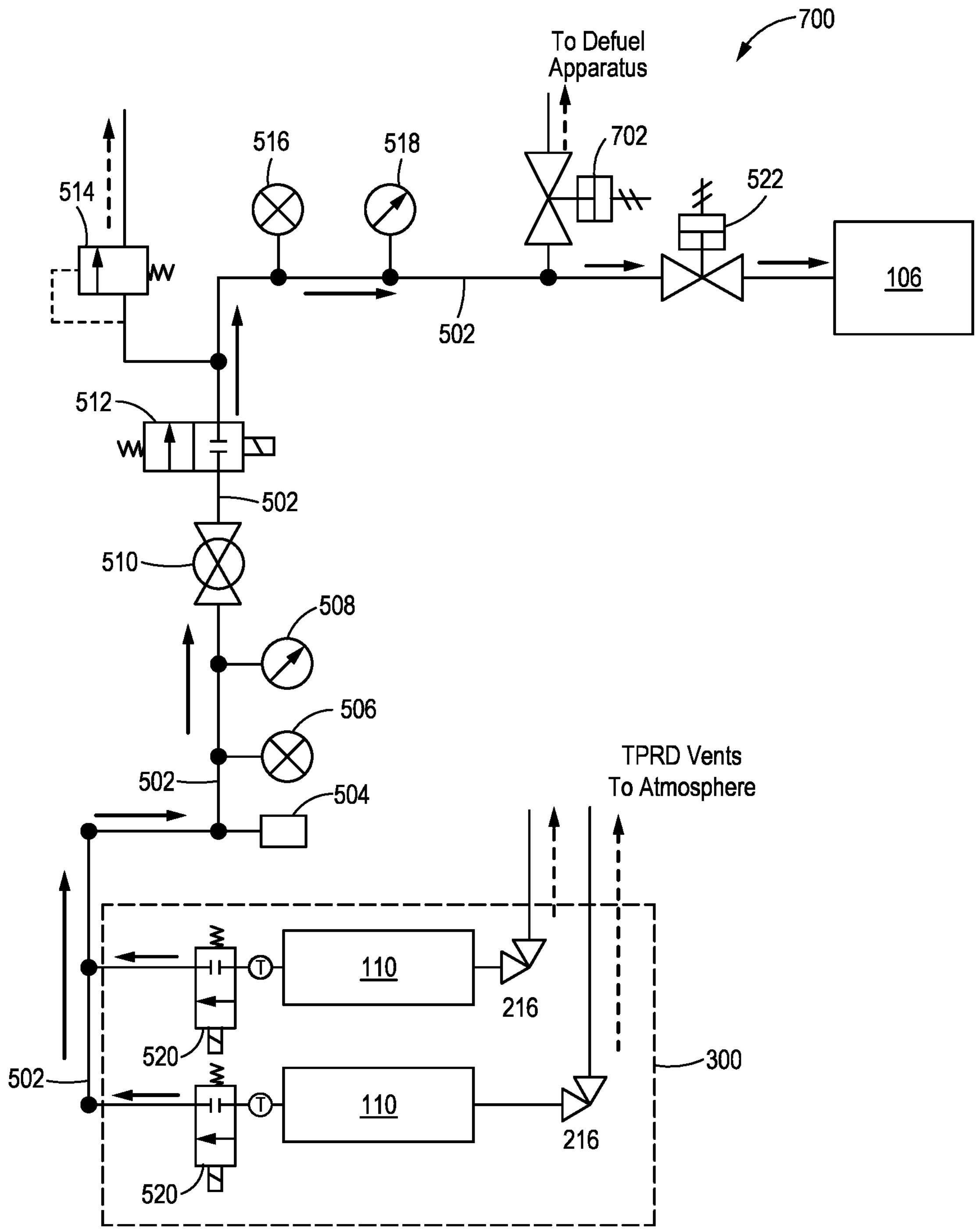
FIG. 7 is a schematic diagram of a third H2 defuel circuit for the H2 fuel system of FIG. 4, according to another embodiment of the present disclosure.

Referring now to FIG. 7, a H2 circuit 700 of the H2 defuel system 400 is illustrated, according to an embodiment of the disclosure. The H2 circuit 700 incorporates the flow control valve 520 on each H2 tank 110 within the plurality of H2 tanks 300. This configuration allows for precise, independent control over the hydrogen release from each of the plurality of H2 tanks 300, enabling a more granular management of the hydrogen supply based on the specific needs or conditions of each tank.

In this embodiment, the purge valve 602 in H2 circuit 600 or the flow control valve 520 in H2 circuit 500 are replaced by a second shut-off valve 702. second shut-off valve 702 is strategically positioned within the circuit to serve as a primary control point for the entire hydrogen flow within H2 circuit 700, effectively halting the hydrogen supply when necessary from reaching the H2 power unit 106. This valve acts as a safeguard, providing an immediate means to isolate the H2 power unit 106 from the hydrogen source in the event of a system anomaly or prior to maintenance operations.

The inclusion of the flow control valve 520 individually on each H2 tank 110 enhances the adaptability of the H2 circuit 700, allowing for tailored management of the hydrogen output from each tank. This arrangement affords the system greater flexibility in responding to varying operational demands or in managing the tanks under different conditions, such as varying pressure levels or rates of hydrogen consumption by the H2 power unit 106.

The integration of the second shut-off valve 702 with the flow control valve 520 across the plurality of H2 tanks 300 provides both precision in hydrogen flow management and safety. This dual focus ensures that H2 circuit 700 maintains a high level of operational integrity, with enhanced capabilities for responding to the dynamic requirements of the work machine 100 and ensuring safety during maintenance and operational pauses.

INDUSTRIAL APPLICABILITY

In operation, the present disclosure may find applicability in many industries including, but not limited to, the automotive, construction, earth-moving, mining, and agricultural industries. Specifically, the systems, machines, and methods of the present disclosure may be used for hydrogen energy systems of other work machines including, but not limited to, earthmoving machines, excavators, backhoes, rope shovels, skid steers, wheel loaders, tractors, automobiles, trucks, cars, and similar machines. While the foregoing detailed description is made with specific reference to earthmoving machines, it is to be understood that its teachings may also be applied to other work machines.

Figure 8:
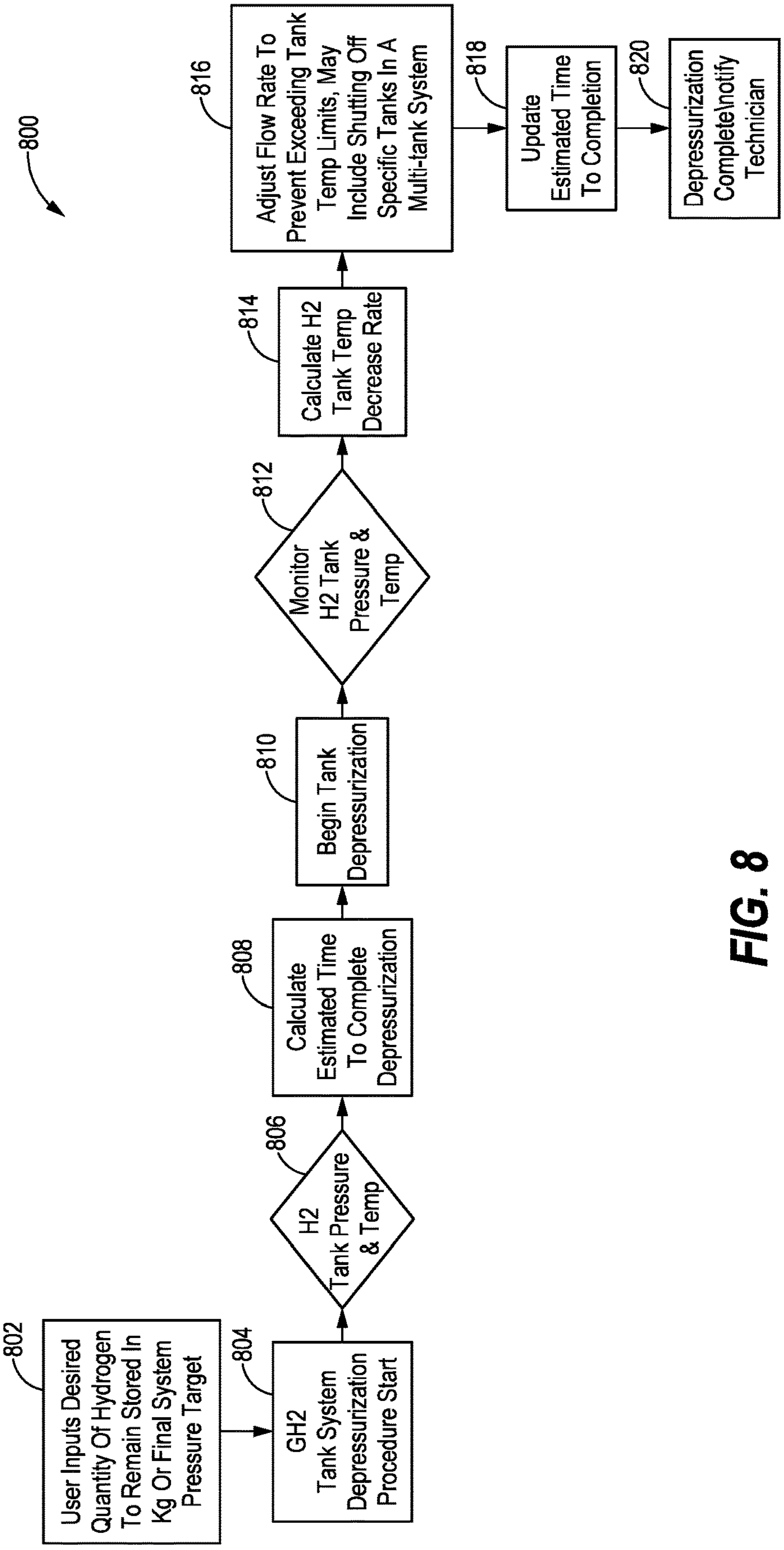
FIG. 8 is a flow-chart of an operation of the H2 defuel circuits of FIG. 5-7, according to an embodiment of the present disclosure.

Now referring to FIG. 8, a H2 defueling operation 800 of the H2 defuel system 400 is illustrated, according to an embodiment of the disclosure. In an operation 802, an operator specifies the target quantity of hydrogen to be retained within the H2 defuel system 400 in kilograms or establishes a final system pressure target.

In an operation 804, the system initiates the H2 defueling operation 800 procedure. Operation 804 involves activating the H2 defuel system 400 protocols and conducting readiness checks for the components critical to the depressurization process, such as the temperature sensor 212, the electronic solenoid valve 214, and the temperature pressure relief device 216.

In an operation 806, real-time monitoring of the pressure and temperature of the H2 tank 110 is monitored via the tank pressure sensor 410 and the tank temperature sensor 412. This continuous monitoring is ensures that the depressurization remains within the predefined safety and operational parameters.

In an operation 808, the control unit 404 calculates an estimated timeframe to reach the depressurization set point, based on the data obtained from the monitoring activities. This estimation aids in the management of the defueling operation's timeline.

In an operation 810, controlled depressurization of the plurality of H2 tanks 300 is commenced. This involves the modulation of the electronic solenoid valve 214 and adjustments to the flow control valves 620 to regulate the release of gaseous hydrogen 200 in a controlled manner.

In an operation 812, the system continues to monitor the pressure and temperature in the H2 defuel system 400 throughout the depressurization process. This ongoing monitoring allows for dynamic adjustments to the depressurization rate to ensure compliance with the set safety and operational standards.

In an operation 814, the rate of temperature decrease within the plurality of H2 tanks 300 during depressurization is calculated. This calculation is pivotal for managing the thermal dynamics of the system and ensuring the structural integrity of the plurality of H2 tanks 300 throughout the process. In an operation 816, the flow rate is adjusted by the modulation of the electronic solenoid valve 214 and adjustments to the flow control valves 620, via the control unit 404, to regulate the release of gaseous hydrogen 200 in a controlled manner. This operation may include shutting off the H2 tank 110 or a specific hydrogen tank in the plurality of H2 tanks 300, or a plurality of H2 tanks 300 simultaneously and/or contemporaneously for controlling the release of gaseous hydrogen 200 from the system.

In an operation 818, the system revises the estimated time to completion based on the real-time operational data, making necessary adjustments to the depressurization timeline as required.

In an operation 820, the defueling process is concluded upon reaching the depressurization set point. The H2 defuel system 400 activates, via the control unit 404, a notification mechanism to inform the technician or system operator that the GH2 Tank System has been adjusted to the specified hydrogen storage level or pressure, marking the completion of the H2 defueling operation 800. This systematic approach ensures the efficient and safe reduction of gaseous hydrogen 200 within the tank(s), adhering to the operational criteria and maintaining the system's integrity.

The H2 defueling operation 800 is initiated by the control unit 404, which first ensures that all system components are in a safe state for depressurization. The control unit 404 then sequentially opens the electronic solenoid valve 214 to begin the controlled release of gaseous hydrogen 200 from the H2 tank 110. The flow rate is managed by gradually adjusting the electronic valves 424 based on real-time data from the pressure and temperature sensors, ensuring a steady decrease in pressure that avoids sudden changes which could compromise system integrity or safety. Simultaneously, the flow control valve 520 modulates to maintain a minimal flow rate, allowing for a controlled and gradual reduction of hydrogen pressure. This orchestrated process ensures that the hydrogen is safely and efficiently removed from the H2 tank 110, preparing the work machine 100 for maintenance or storage.

Figure 9:
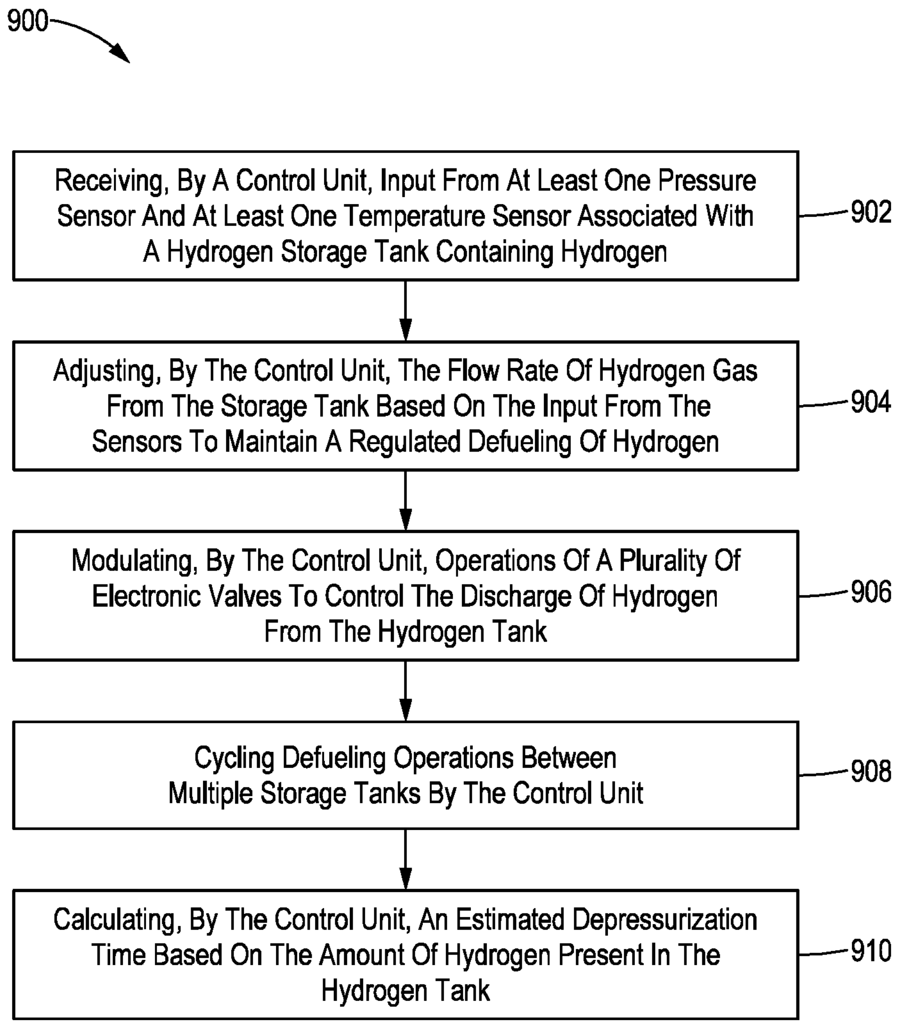
FIG. 9 is a flow-chart of a method of defueling hydrogen from the H2 tank of FIG. 2, according to an embodiment of the present disclosure.

Referring now to FIG. 9, a flowchart of a hydrogen defueling method 900 for the H2 tank 110 is illustrated, according to an embodiment of the present disclosure. The hydrogen defueling method 900 initiates with a step 902, wherein the control unit 404 receives input from at least one pressure sensor and at least one temperature sensor 424 associated with the H2 tank 110 containing gaseous hydrogen 200.

In a step 904, the control unit 404, based on the received sensor inputs, adjusts the flow rate of gaseous hydrogen 200 from the H2 tank 110 to ensure the gaseous hydrogen 200 is maintained within predefined pressure limits. In a step 906, the control unit 404 modulates the operations of a plurality of electronic valves 424 within the H2 defuel system 400. This modulation controls the discharge of hydrogen from the H2 tank 110, facilitating a regulated and efficient defueling process of gaseous hydrogen 200 within pressure and temperature thresholds.

Subsequent to the modulation of electronic valves 424, step 908 may include cycling defueling operations between multiple storage tanks by the control unit 404, if applicable. Step 908 ensures that the defueling process is evenly distributed among the plurality of H2 tanks 300.

In a step 910, the control unit 404 calculates an estimated depressurization time based on the amount of hydrogen present in the H2 tank 110 and the current operational parameters. This estimated time aids in scheduling and monitoring the defueling process.

Throughout the defueling process, the control unit 404 continuously monitors operation of the H2 defuel system 400 within pressure and temperature thresholds via data signals communicated to the control unit 404 from the at least one pressure sensor, the at least one temperature sensor 412, and the plurality of electronic valves 424.

The control unit 404 may receive signals of ambient temperature conditions from an external temperature sensor and adjust the defueling rate based on the ambient temperature conditions, optimizing the defueling process for environmental variations. This control unit 404 would also provide an estimated depressurization time based on current amount of gaseous hydrogen 200 present & tank ambient temperatures of the plurality of H2 tanks 300 at the start of the procedure. The control unit 404 will cycle defueling from each of the plurality of H2 tanks 300 to prevent exceeding individual tank temperatures.

The hydrogen defueling method 900 may further implement a geofence protocol using GPS capabilities, and other wireless location communications, as generally known in the arts, to automatically initiate the defueling process upon the work machine 100 entering a predetermined service area, streamlining the defueling operations.

In industries where downtime directly impacts productivity and costs, such as transportation and heavy machinery, the H2 defueling system 400's automated and efficient operation minimizes maintenance and refueling downtimes, directly contributing to enhanced operational efficiency. For the renewable energy sector, where the integrity and reliability of hydrogen storage are paramount, the H2 defueling system 400's precise pressure and temperature management safeguard against fuel degradation and potential safety hazards.

As part of the continuous enhancement of the H2 defuel system 400, an automated service procedure has been integrated, accessible through the interface display 426 on the work machine 100 or via a technician's service tool. This procedure is designed to optimize the depressurization flow rates within the H2 circuits 500, 600, 700, specifically targeting the mitigation of gaseous hydrogen 200 discharge delays potentially caused by the internal hydrogen tank temperature reaching its limits. This adjustment modulation strategy maintains the operational efficiency and safety standards of the H2 defuel system 400, particularly under varying operational and environmental conditions.

The control unit 404 evaluates the current hydrogen volume within the plurality of H2 tanks 300, as well as the initial temperatures of both the tanks and the surrounding environment. Based on these parameters, the control unit 404 calculates an accurate estimation of the time required for complete depressurization and may display on the interface display 426. This enables the control unit 404 to sequentially manage the depressurization process across the tanks, thus preventing any single tank from overheating and compromising the system's integrity.

Enhancing the operational versatility of the H2 defuel system 400, a geofencing feature has been implemented, utilizing RFID technology to automatically initiate the defueling process as the work machine 100 enters a predetermined service zone. This feature allows service technicians to predefine the desired pressure or remaining hydrogen mass parameters through the interface display 426, ensuring that the defueling process aligns with specific safety regulations or maintenance requirements.

Incorporating ambient temperature data into the operational protocol of the H2 defuel system 400 enhances its performance and safety profile. The control unit 404 can also integrate ambient temperature readings. These readings could be sourced from temperature sensors within the machine operational systems 406 or dedicated ambient temperature sensors mounted on the work machine 100. By assimilating this ambient temperature data, the control unit 404 can make more informed decisions regarding the adjustment of hydrogen flow rates and the management of depressurization processes in the H2 circuits 500, 600, 700. This support environments where external temperature fluctuations can impact the internal temperature dynamics of the plurality of H2 tanks 300, potentially affecting the efficiency of hydrogen release and the overall safety of the system. The integration of ambient temperature data ensures that the H2 defuel system 400 operates within optimal thermal conditions, adapting its performance to both the internal and external thermal landscapes, thereby safeguarding the integrity of the hydrogen storage and the work machine 100 itself.

The automation of the defueling process, especially within systems equipped with multiple H2 tanks 300, significantly improves the efficiency of maintenance operations. Traditional manual interventions, particularly prevalent in extensive systems such as those used in locomotives or hydrogen-powered trucks, are substantially reduced. This not only accelerates the defueling process but also minimizes the reliance on manual temperature monitoring, which can be particularly challenging in adverse environmental conditions.

The system's adaptability to accommodate tanks from different manufacturers, each with its own temperature and pressure specifications, is ensured by the flexible programming of the control unit 404. This adaptability extends the H2 defuel system 400's compatibility across a broad spectrum of the plurality of H2 tanks 300, ranging from smaller capacities around 30 kg to larger tanks capable of storing several hundred kilograms of hydrogen.

The procedure of the H2 defuel system 400 is considers unique characteristics and safety requirements of the service environment. Factors such as potential hazards from overhead heating systems and the volumetric capacity of the service facility, which could influence hydrogen gas concentration, may be integrated into the risk management strategies of the H2 defuel system 400.

From the foregoing, it can be seen that the technology disclosed herein has industrial applicability in a variety of settings such as, but not limited to the automotive, agricultural, construction, energy production, and mining industries that utilize work machines such as automobiles, cars, trucks, earthmoving machines, excavators, backhoes, rope shovels, skid steers, wheel loaders, tractors, and similar work machines having a power unit or engine that uses hydrogen as fuel.

What is claimed is:

1. A H2 defueling system for automating defueling of a hydrogen storage tank, comprising:

a hydrogen storage tank containing hydrogen;

a plurality of electronic valves configured for regulating hydrogen discharge of hydrogen from the hydrogen storage tank;

at least one pressure sensor and at least one temperature sensor;

a hydraulic circuit interconnecting the hydrogen storage tank, the plurality of electronic valves, the at least one pressure sensor and the at least one temperature sensor; and a control unit configured to:

receive input from the at least one pressure sensor and the at least one temperature sensor;

automatically adjust the flow rate of gaseous hydrogen from the hydrogen storage tank based on the input from the at least one pressure sensor and the at least one temperature sensor to modulate operations of the plurality of electronic valves to control the flow of hydrogen defueling from the hydrogen storage tank.

2. The H2 defueling system of claim 1, wherein the hydrogen storage tanks includes an inner tank containing the hydrogen, an outer tank surrounding the inner tank and forming an annular space between the inner tank and the outer tank, and at least one of:

the inner tank made of a material selected from the group consisting of high-strength steel, high-strength carbon-fiber, polymers, and high-strength aluminum alloy;

the outer tank made of a material selected from the group consisting of high-strength steel, high-strength carbon-fiber, and high-strength aluminum alloy;

an insulation material provided in the annular space and being one of multiple layers of high-performance insulation materials, aerogel blankets, and vacuum-sealed panels; and a fluid level sensor positioned within the inner tank and configured to monitor and provide real-time feedback on a volume of gaseous hydrogen stored within the inner tank.

3. The H2 defueling system of claim 1, the control unit is further configured to cycle defueling operations between a plurality of hydrogen storage tanks.

4. The H2 defueling system of claim 1, wherein the control unit is accessible via an interface display and the control unit is further configured to calculate an estimated depressurization time based on the amount of hydrogen present in the hydrogen tank.

5. The H2 defueling system of claim 1, further comprising:

a temperature pressure relief device (TPRD); and an integrated safety system including temperature sensors, leak detectors, and emergency shut-off mechanisms, configured to ensure safe operation.

6. The H2 defueling system of claim 1, wherein the control unit is configured to receive signals of ambient temperature conditions from a temperature sensor and vary the defueling rate based on the ambient temperature conditions.

7. The H2 defueling system of claim 1, wherein the control unit is further configured to implement a geofence protocol using RFID communication to initiate the defueling process upon the machine/vehicle entering a predetermined service area.

8. A method for automating defueling of a hydrogen storage tank in a hydrogen defueling system, the method comprising:

receiving, by a control unit, input from at least one pressure sensor and at least one temperature sensor associated with a hydrogen storage tank containing hydrogen;

adjusting, by the control unit modulating operations a plurality of electronic valves, the flow rate of gaseous hydrogen from the hydrogen storage tank based on the input from the at least one pressure sensor and at least one temperature sensor to maintain a regulated defueling of hydrogen from the hydrogen fuel system.

9. The method of claim 8, further comprising cycling defueling operations between multiple storage tanks by the control unit.

10. The method of claim 8, further comprising providing access to the control unit via an interface display and calculating, by the control unit, an estimated depressurization time based on the amount of hydrogen present in the hydrogen storage tank.

11. The method of claim 8, further comprising:

venting hydrogen in emergency situations using a temperature pressure relief device (TPRD);

monitoring for operation within pressure and temperature thresholds via data signals communicated to the control unit from the at least one pressure sensor, the at least one temperature sensor, and the plurality of electronic valves.

12. The method of claim 8, further comprising: receiving signals of ambient temperature conditions from a temperature sensor by the control unit and varying the defueling rate based on the ambient temperature conditions.

13. The method of claim 8, further comprising: implementing a geofence protocol to initiate the defueling process upon the machine/vehicle entering a predetermined service area.

14. A hydrogen fuel system, comprising:

a hydrogen storage tank for storing gaseous hydrogen;

a hydrogen power unit configured to convert gaseous hydrogen into energy;

a hydrogen fuel circuit including a plurality of hydraulic lines for conveying gaseous hydrogen from the hydrogen tank to the hydrogen power unit;

a hydrogen defueling system integrated with the hydrogen fuel system, the defueling system including:

a plurality of electronic valves positioned within the hydraulic circuit to regulate the discharge of gaseous hydrogen from the hydrogen tank and control the supply of gaseous hydrogen to the hydrogen power unit;

at least one pressure sensor and at least one temperature sensor positioned on the hydrogen storage tank and the hydraulic circuit to monitor pressure and temperature of the hydrogen fuel system;

a control unit in communication with the at least one pressure sensor, the at least one temperature sensor, and the plurality of electronic valves, the control unit configured to:

receive real-time data signals from the at least one pressure sensor, the at least one temperature sensor, and the plurality of electronic valves;

automatically adjust the flow rate of gaseous hydrogen from the hydrogen storage tank by modulating the plurality of electronic valves to control the gaseous hydrogen flow in the plurality of hydraulic lines and discharge the gaseous hydrogen from the hydrogen storage tank for defueling the hydrogen fuel system.

15. The hydrogen fuel system of claim 14, further comprising:

an electronic solenoid valve on the tank; and a flow control valve on the H2 fuel circuit.

16. The hydrogen fuel system of claim 14, further comprising:

an electronic solenoid valve on the tank;

a flow control valve on the hydrogen tank; and an electronic shut off valve on the H2 fuel circuit.

17. The hydrogen fuel system of claim 14, further comprising:

an electronic solenoid valve on the tank; and a purge needle valve on the H2 fuel circuit.

18. The hydrogen fuel system of claim 14, wherein the control unit is accessible via an interface display, the control unit is further configured to:

provide real-time data and diagnostics related to the H2 fuel circuit and the H2 defueling system;

receive signals of ambient temperature conditions from an external temperature sensor and adjust the fueling and defueling rates based on the ambient temperature conditions; and implement a geofence protocol to automatically initiate fueling or defueling processes upon the work machine entering a predetermined service or maintenance area.

19. The hydrogen fuel system of claim 14, wherein the hydrogen storage tank is a plurality of H2 tanks, each of the plurality of H2 tanks includes a temperature pressure relief device, and the hydraulic circuit includes a fueling connector, at least one gauge, a pressure regulator, a pressure relief valve, and a shut off valve for limiting gaseous hydrogen to the hydrogen power unit.

20. The hydrogen fuel system of claim 14, wherein the hydrogen tank is a plurality of H2 storage tanks integrated into a work machine or a facility.

* * * * *